US010521304B1

(12) United States Patent
Reddy et al.

(10) Patent No.: US 10,521,304 B1
(45) Date of Patent: Dec. 31, 2019

(54) MULTIDIMENSIONAL RAID

(71) Applicant: EMC IP Holding Company LLC, Hopkinton, MA (US)

(72) Inventors: Vikrama Reddy, Bangalore (IN); Subhadip Das, Kolkata (IN); Mejo Kannanayakkal, Thrissur (IN); Anjali Gupta, Bangalore (IN); Sanjib Mallick, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 241 days.

(21) Appl. No.: 15/667,258

(22) Filed: Aug. 2, 2017

(51) Int. Cl.
*G06F 11/00* (2006.01)
*G06F 11/10* (2006.01)
*G06F 3/06* (2006.01)

(52) U.S. Cl.
CPC ........ *G06F 11/1096* (2013.01); *G06F 3/0619* (2013.01); *G06F 3/0665* (2013.01); *G06F 3/0689* (2013.01); *G06F 11/1092* (2013.01)

(58) Field of Classification Search
CPC ............. G06F 11/1096; G06F 11/1076; G06F 11/108; G06F 11/1084; G06F 11/1088; G06F 11/1092; G06F 3/0619; G06F 3/0665; G06F 3/0689; G06F 3/0604; G06F 3/0614; G06F 3/0668; G06F 3/0683
See application file for complete search history.

(56) References Cited

U.S. PATENT DOCUMENTS

| | | | | |
|---|---|---|---|---|
| 6,101,615 A * | 8/2000 | Lyons | ................. | G06F 11/1076 711/114 |
| 6,993,701 B2 * | 1/2006 | Corbett | ............... | G06F 11/1076 711/114 |
| 7,437,652 B2 * | 10/2008 | English | ............... | G06F 11/1076 714/770 |
| 8,595,606 B1 * | 11/2013 | Feng | ................. | H03M 13/2909 714/800 |
| 8,990,495 B2 * | 3/2015 | Hallak | ................ | G06F 11/1076 711/114 |
| 2003/0074527 A1 * | 4/2003 | Burton | .................. | G06F 3/0601 711/114 |
| 2013/0145091 A1 * | 6/2013 | Klemm | ............... | G06F 11/1076 711/114 |

OTHER PUBLICATIONS

S. W. Ng and R. L. Mattson, "Uniform parity group distribution in disk arrays with multiple failures," in IEEE Transactions on Computers, vol. 43, No. 4, pp. 501-506, Apr. 1994. (Year: 1994).*

* cited by examiner

*Primary Examiner* — Anthony J Amoroso
(74) *Attorney, Agent, or Firm* — Amin, Turocy & Watson, LLP

(57) ABSTRACT

Data recovery is enabled using techniques described herein. A system can include data storage devices configured in a plurality of logical configurations, wherein the logical configurations are respectively associated with respective groups of the data storage devices, and wherein the respective groups of the data storage devices are structured such that at least a first one of the respective groups of the data storage devices comprises a different number of data storage devices than a second one of the respective groups of the data storage devices; and respective parity storage devices communicatively coupled to the data storage devices, wherein respective ones of the groups of the data storage devices are associated with respective ones of the parity storage devices.

19 Claims, 14 Drawing Sheets

| | Normal drive, no errors | | Parity drive, not in use |
|---|---|---|---|
|  | Faulty drive, to be recovered |  | Parity drive, in use |
|  | Recovered drive | | |

MULTIDIMENSIONAL RAID

TECHNICAL FIELD

The subject application is related to storage, and more particularly, to multidimensional raid storage systems and to usage thereof in data recovery.

BACKGROUND

Computing systems can store information via the use of non-transitory computer-readable storage devices such as solid state drives, hard disk drives, and the like. However, these storage devices can be subject to failure and/or loss of data over time due to wear, mechanical problems, and/or other issues. Various techniques, such as RAID (redundant array of independent disks), are used to provide protection against data loss via redundant storage of data on multiple storage devices, e.g., such that loss of data on a single drive does not prevent permanent loss of that data.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a data storage system is described herein. The data storage system includes data storage devices configured in a plurality of logical configurations, where the logical configurations are respectively associated with respective groups of the data storage devices. The respective groups of the data storage devices are structured such that at least a first one of the respective groups of the data storage devices includes a different number of data storage devices than a second one of the respective groups of the data storage devices. The data storage system further includes respective parity storage devices communicatively coupled to the data storage devices, where respective ones of the groups of the data storage devices are associated with respective ones of the parity storage devices.

In another aspect, a method is described herein. The method includes configuring, by a system comprising a processor, disks according to a first logical configuration including a first set of disk groups, where respective ones of the first set of disk groups include one or more data disks and one or more parity disks and at least a first one of the first set of disk groups includes a different number of disks than a second one of the first set of disk groups. The method further includes initiating a first data recovery for respective ones of the first set of disk groups via the one or more parity disks associated with the respective ones of the first set of disk groups. The method additionally includes configuring the disks according to a second logical configuration including a second set of disk groups, where respective ones of the second set of disk groups include one or more of the data disks and one or more of the parity disks, at least a first one of the second set of disk groups includes a different number of disks than a second one of the second set of disk groups, and the respective ones of the second set of disk groups are distinct from the respective ones of the first set of disk groups. The method also includes initiating a second data recovery for the respective ones of the second set of disk groups via the one or more of the parity disks associated with the respective ones of the second set of disk groups.

In an additional aspect, a system is described herein. The system includes data disks; a first group of parity disks, where respective ones of the first group of parity disks are associated with respective first groupings of the data disks and the first groupings of the data disks are associated with different numbers of the data disks; a second group of parity disks, where respective ones of the second set of parity disks are associated with respective second groupings of the data disks, the second groupings of the data disks are distinct from the first groupings, and the second groupings of the data disks are associated with different numbers of the data disks; and a third group of parity disks, where respective ones of the third set of parity disks are associated with respective third groupings of the data disks, the third groupings of the data disks are distinct from the first groupings the second groupings, and the third groupings of the data disks are associated with different numbers of the data disks.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

Figure 1:
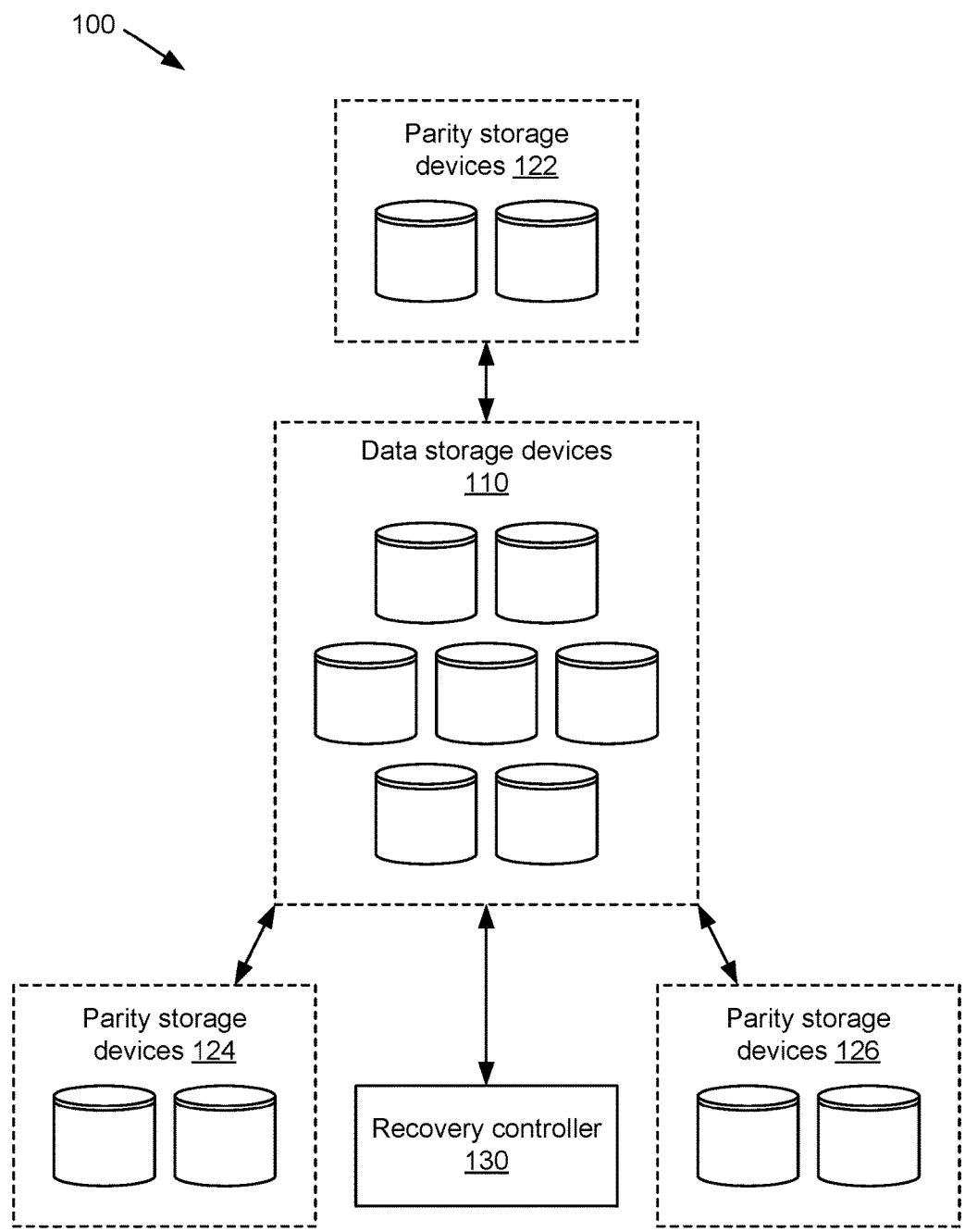
FIG. 1 is a block diagram of a data storage system with multidimensional redundancy and data recovery.

Referring first to FIG. 1, a data storage system 100 with multidimensional redundancy and data recovery is illustrated. The system 100 includes respective data storage devices 110, which can be utilized, e.g., in combination with a computer comprising at least one processor, to store information associated with a computer. In an aspect, the data storage devices 110 are tangible, non-transitory computer-readable storage media such as hard disk drives, solid state drives, optical disk (e.g., CD, DVD, etc.) drives, magnetic tape storage devices, or the like. Additionally or alternatively, respective ones of the data storage devices 110 can be distinct physical devices or respective logical units of a physical device, such as disk partitions, stripes, or the like. The data storage devices 110 can be associated with a variety of computing environments, such as a data center, a database server, an enterprise server, etc. It should be appreciated that the data storage devices 110 could be associated with any type of computing environment either presently existing or developed in the future.

In an aspect, the data storage devices 110 are associated with respective parity storage devices or other storage devices, here three sets of parity storage devices 122, 124, 126. The parity storage devices 122, 124, 126 can provide fault tolerance for the data storage devices 110 by storing information that can be used to recover the contents of a lost (e.g., malfunctioning, corrupted, failed, etc.) storage device. As an example, one or more parity storage devices 122, 124, 126 can be associated with a stripe or other grouping of respective ones of the data storage devices 110 and store information derived from the contents of the associated data storage devices 110. For instance, parity storage devices 122, 124, 126 can store parity information that is computed as an exclusive or (XOR) of respective contents of the associated data storage devices 110, and/or parity information computed in any other suitable manner. In another aspect, multiple parity storage devices 122, 124, 126 can be associated with the same grouping of data storage devices 110 to store parity information computed in different manners. Various techniques by which parity storage devices 122, 124, 126 can be utilized to provide parity information are described in further detail below.

In an embodiment shown by FIG. 1, multiple sets of parity storage devices, here three sets of parity storage devices 122, 124, 126, are associated with the data storage devices 110. In an aspect, the different sets of parity storage devices 122, 124, 126 are associated with respective logical configurations (e.g., groupings, partitions, etc.) of the data storage devices 110. For instance, the first set of parity storage devices 122 can provide parity information for respective first groups of the data storage devices 110 or portions thereof, the second set of parity storage devices 124 can provide parity information for respective second groups of the data storage devices 110 that are composed of different devices than the first groups of the data storage devices 110, and the third set of parity storage devices 126 can provide parity information for respective third groups of the data storage devices 110 that are composed of different devices than the first and second groups of the data storage devices 110. Specific techniques for logically configuring the data storage devices 110 and associating those logical configurations with respective parity storage devices 122, 124, 126 are described in further detail herein. While three sets of parity storage devices are shown in FIG. 1 that correspond to three respective logical configurations of the data storage devices 110, it should be appreciated that the data storage devices 110 in system 100 could have as few as two configurations with associated sets of parity storage devices, or as many configurations and corresponding parity storage devices as are feasible, without departing from the scope of the present disclosure.

As further shown by FIG. 1, the data storage devices 110 and/or parity storage devices 122, 124, 126 are communicatively coupled to a recovery controller 130 that can initiate and conduct recovery for one or more lost data storage devices 110 according to various techniques described herein. The recovery controller can, in some embodiments, be associated with a same computing device as the data storage devices 110 and/or a different computing device. Further, the recovery controller 130 can be implemented in software (e.g., via instructions stored on a tangible computer-readable storage medium and executed by one or more processors), hardware, or a combination of hardware and software. In an aspect, the recovery controller 130 can be configured to initiate data recovery upon detecting a failure condition associated with one or more of the data storage devices 110, and/or upon other conditions, such as a fixed maintenance schedule. Techniques utilized by the recovery controller 130 for maintaining the data storage devices 110 are described in further detail herein.

Figure 2:
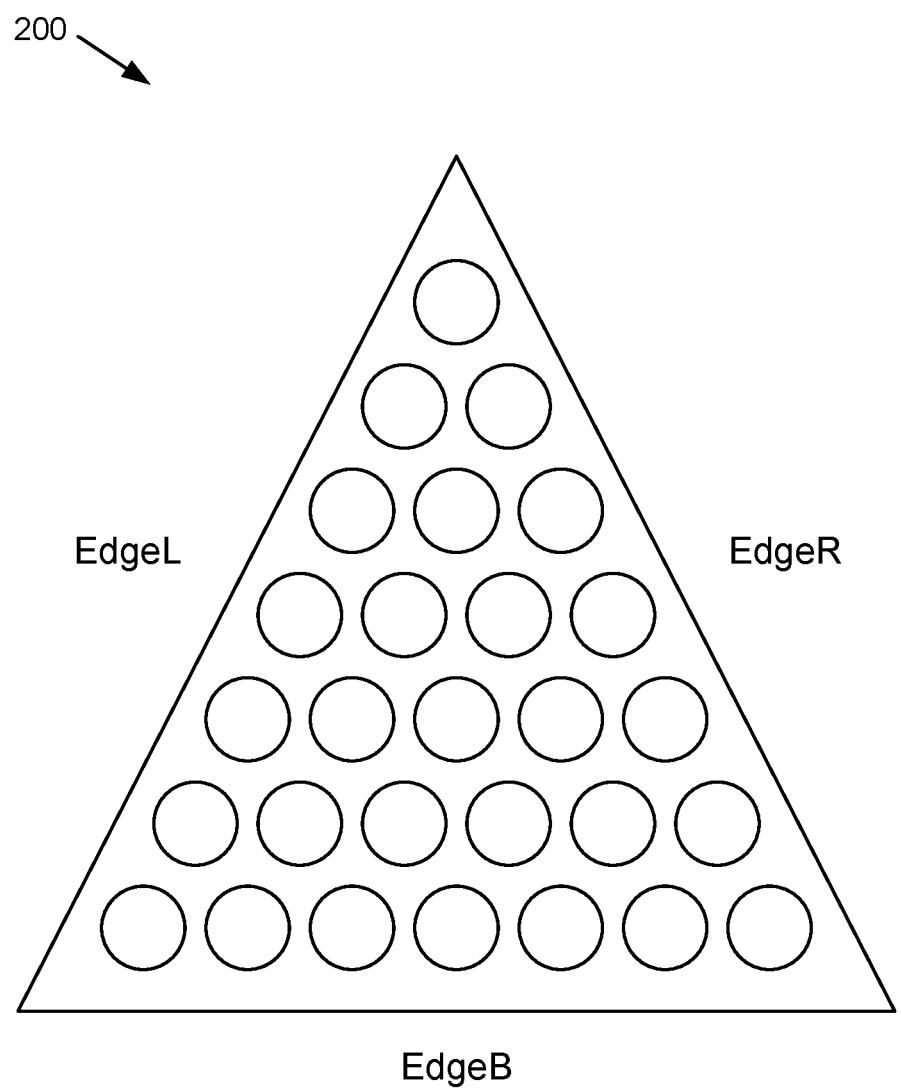
FIG. 2 is a diagram depicting an example configuration of storage disks in a triangular RAID array.

Turning next to FIG. 2, diagram 200 depicts a visual interpretation of logical groupings of data storage disks, e.g., data storage devices 110, that can be utilized in various embodiments described herein. A set of disks as configured in the manner shown by FIG. 2 can be utilized by a triangle RAID (redundant array of independent disks) architecture, which is a novel fault tolerance architecture designed for data protection using arrays of respective disks. Triangle RAID can be utilized in connection with solid state drives (SSDs) as well as any other type(s) of hard disks and/or other forms of data storage. Triangle RAID utilizes multiple redundant disks for fault tolerance in various aspects as described below.

As shown in FIG. 2, a triangle RAID architecture can be visualized as a set of disks located inside an equilateral triangle. It should be appreciated, however, that the arrangement of disks shown by FIG. 2 is for purposes of visualization only and that the associated disks can be physically positioned and/or otherwise configured in any suitable manner. For purposes of description, the edges of the triangle in FIG. 2 are referred to herein as EdgeB (bottom edge), EdgeL (left edge), and EdgeR (right edge).

In an aspect, for an equilateral triangle of N disks (e.g., seven disks in FIG. 2), each edge of the triangle is associated with N disks. Hence, for a triangle with edges of size N, there are three edges with N disks each, and a total of N(N+1)/2 disks in total (e.g., 7(7+1)/2=28 disks for the triangle shown in FIG. 2). These N(N+1)/2 disks form the part of the larger protection target for triangle RAID.

In an aspect, rather than protecting the entire structure of N (N+1)/2 disks shown in FIG. 2 as a single set, triangle RAID can break these disks into sets of conventional disk groups (e.g., RAID groups). For example, as shown by diagram 300 in FIG. 3, there are N stripes, here seven stripes 301-307, that are parallel to EdgeB. These stripes 301-307 are referred to herein as EdgeB disk groups. Similarly to the EdgeB disk groups shown in diagram 300, there are N EdgeL disk groups and N EdgeR disk groups for a triangle of side length N. From these groupings, there are a total of 3N disk groups in the triangle, e.g., N stripes parallel to each of EdgeB, EdgeL, and EdgeR.

Figure 3:
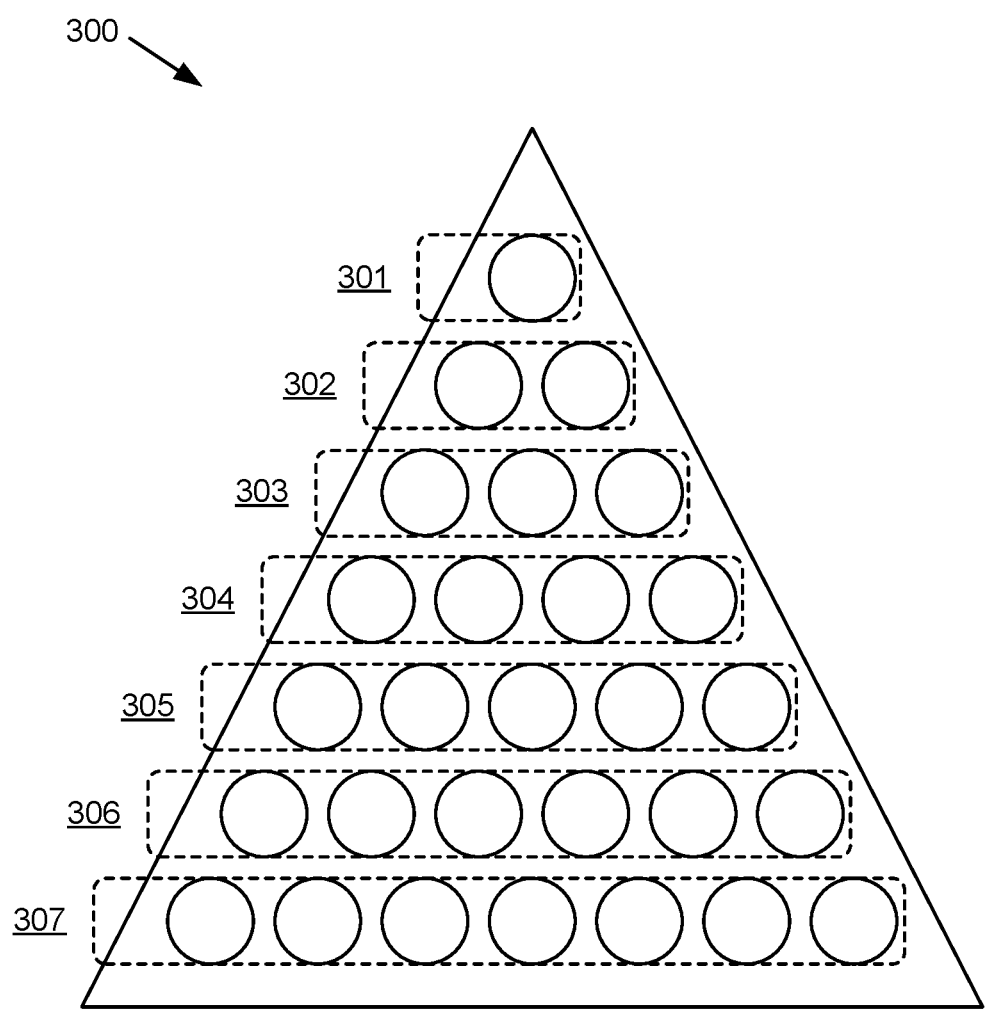
FIG. 3 is a diagram depicting example storage disk groupings for the triangular RAID array of FIG. 2.

As additionally shown by diagram 300 in FIG. 3, the disk groups associated with a given edge of the triangle have non-uniform sizes. Thus, at least a first one of the stripes 301-307 has a different number of disks than at least a second one of the stripes 301-307. Here, the disks are arranged as a triangle such that each stripe 301-307 is associated with one more disk than its immediately preceding stripe 301-307, e.g., EdgeB, EdgeL, and EdgeR each have N groups of sizes {1, 2, 3, . . . , N}. It should be appreciated, however, that while the description provided herein relates to the specific example of a triangular configuration, other configurations having non-uniform group sizes could also be used.

In an aspect, the 3N disk groups associated with the structure shown in FIG. 3 serve as the lowest unit of data protection. Each disk in the structure is part of three of the 3N disk groups in the system, e.g., one EdgeB group, one EdgeL group, and one EdgeR group. The disks are configured such that a disk at a vertex of the structure is part of one disk group of size 1 and two disk groups of size N, and a disk at any other position in the system is part of three disk groups belong to EdgeB, EdgeL, and EdgeR, respectively. The three disk groups that a given disk belongs to is determined based on the location of the disk in the structure.

In another aspect, a disk group can be protected using one or more RAID policies, which can include, but are not limited to, RAID 3, RAID 5, RAID-DP (RAID with double or diagonal parity), etc. While individual policies can differ in specific fault tolerance schematics, the concepts described herein can be extended to any suitable policy.

Figure 4:
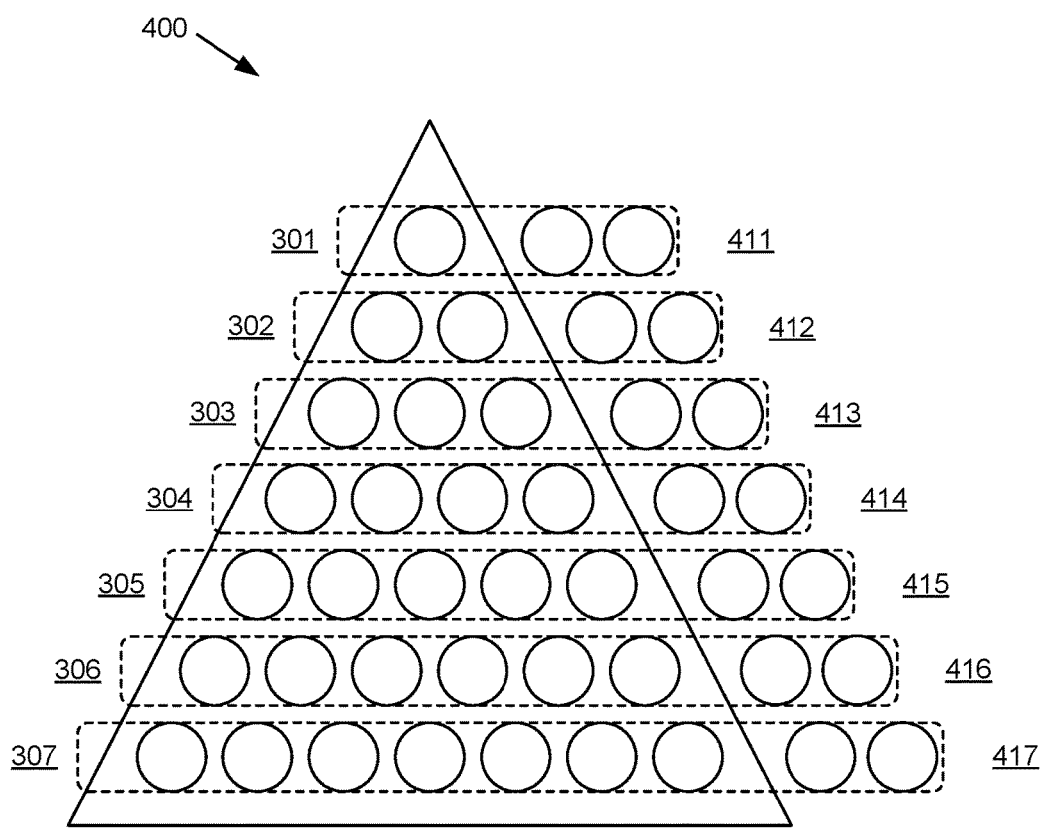
FIG. 4 is a diagram depicting an example parity disk configuration that can be associated with the storage disk groupings of FIG. 3.

Turning next to diagram 400 in FIG. 4, parity disk groups 411-417 associated with respective ones of the EdgeB stripes 301-307 are depicted. Here, the parity disks 411-417 are allocated to the respective stripes 301-307 according to a RAID-DP scheme. The RAID-DP scheme can function by maintaining two parity disks for each disk group or stripe, the first parity disk containing a first set of parity data for the corresponding disk group (e.g., "horizontal" parity data) and the second parity disk containing a second, different set of parity data (e.g., "diagonal" parity data). By maintaining two separate parity disks and corresponding sets of parity data for each disk group, up to two lost disks per disk group can be recovered. It should be appreciated that while the description provided herein relates to the use of RAID-DP, other RAID policies could also be used.

Figure 5:
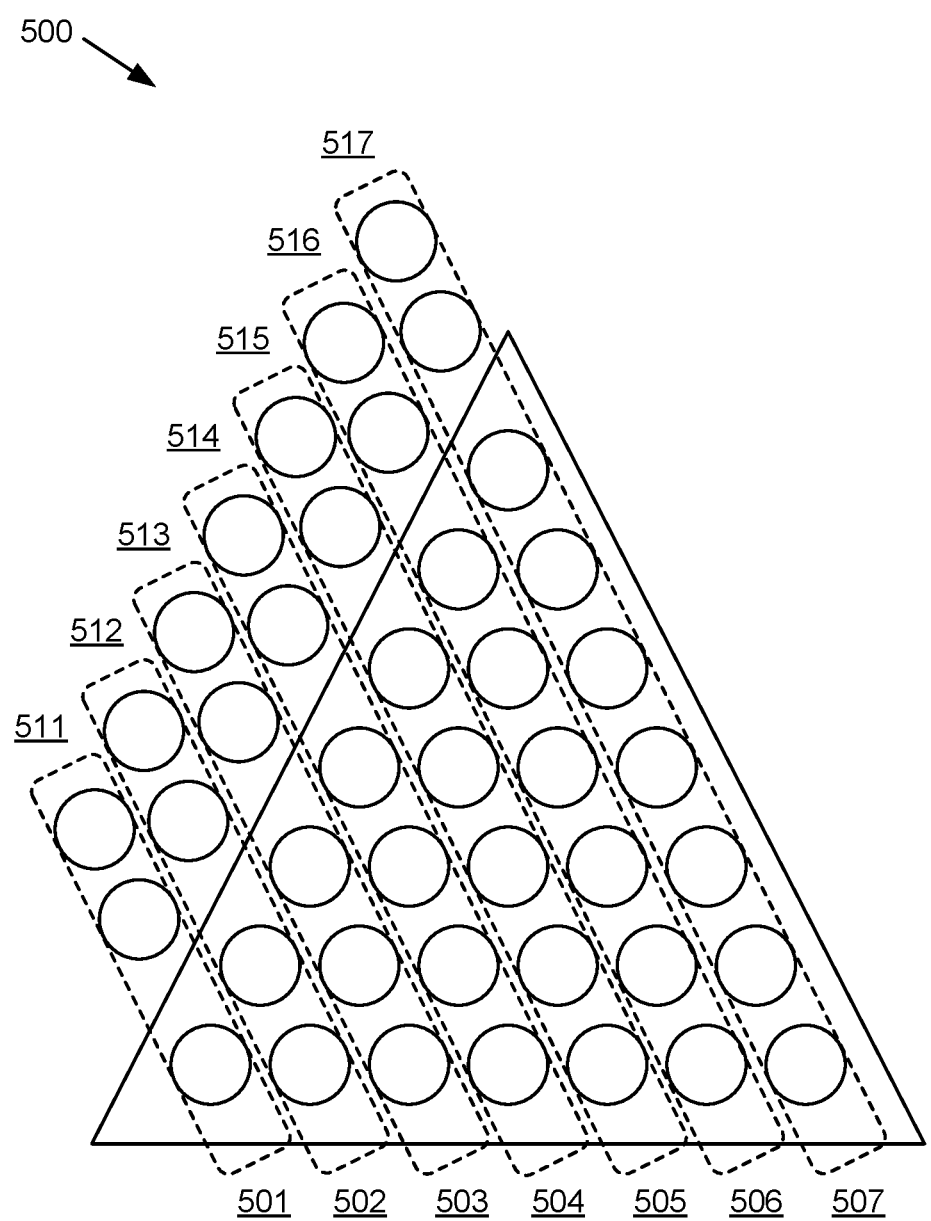
FIGS. 5-6 are diagrams depicting respective additional storage and parity disk groupings for the triangular RAID array of FIG. 2.
Figure 6:
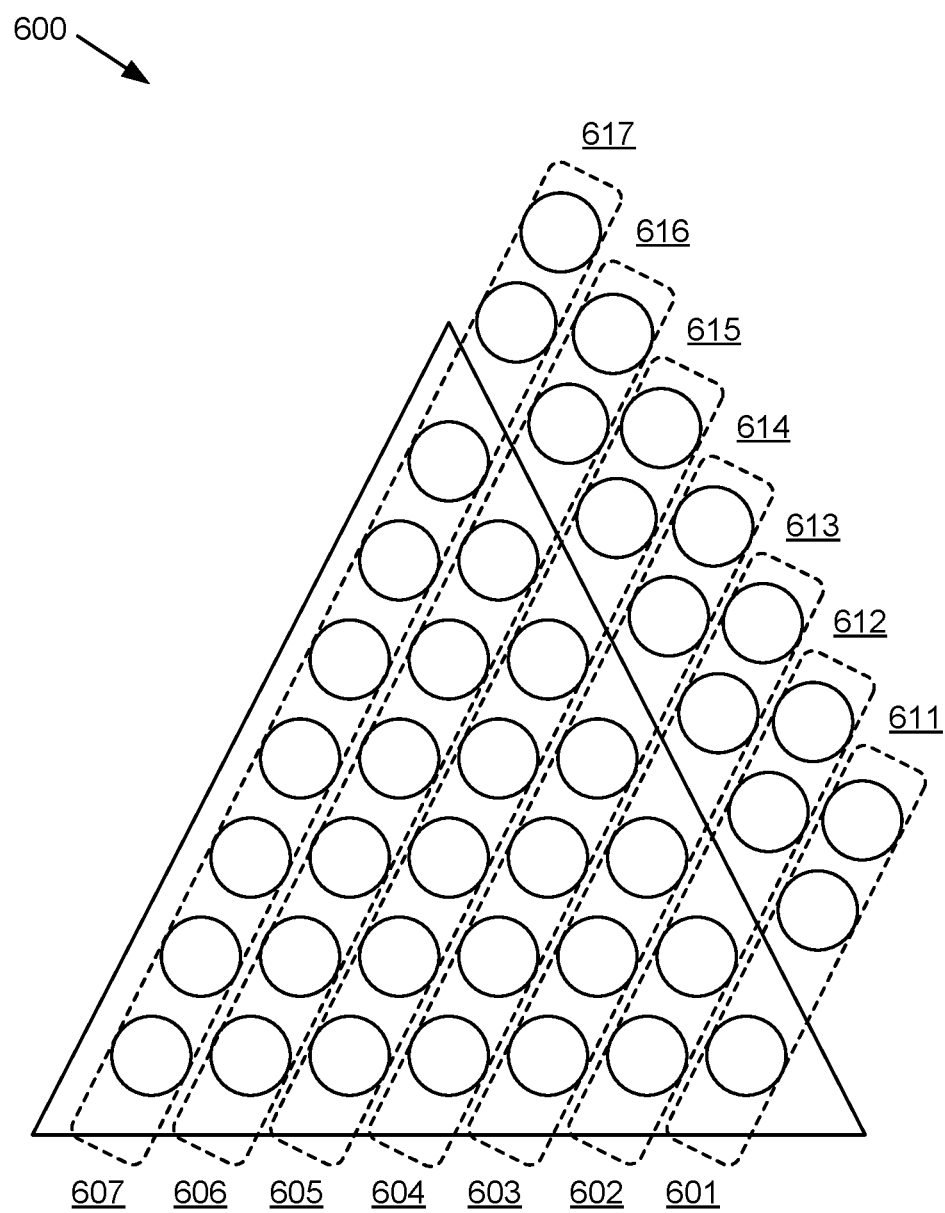

As shown by FIG. 4, with N EdgeB disk groups that are each associated with two parity disks, the total number of parity disks associated with EdgeB is 2N. Totaling over all 3N stripes in the system, including each of the EdgeB, EdgeL, and EdgeR groups, the total number of parity disks associated with the system is 3(2N)=6N parity disks. Diagram 500 in FIG. 5 depicts the set of EdgeR groups 501-507 in the system and their corresponding parity disk groups 511-517, and diagram 600 in FIG. 6 depicts the set of EdgeL groups 601-607 in the system and their corresponding parity disk groups 611-617. With respect to each of the disk groups shown in FIGS. 4-6, it can be appreciated that each disk group 301-307, 501-507, 601-607, is associated with two parity disks irrespective of disk group size and can provide fault tolerance for up to two lost disks.

To summarize the above, a triangular RAID structure of size N can be visualized as an equilateral triangle of size N composed of N(N+1)/2 disks and 3N disk groups. Respective ones of the disk groups can be protected by two parity disks, resulting in a total of 6N parity disks.

In an aspect, respective disks in the system illustrated by FIGS. 2-6 are part of three unique disk groups. Thus, any update to a disk in the system can result in corresponding updates to its respective disk groups. In one example, a block write to a target disk in the system can result in respective disk reads associated with other disks in the target disk's disk groups and parity disk updates associated with each of the six parity disks associated with the target disk.

Using the system shown in FIGS. 2-6, disk recovery can be initiated (e.g., by the recovery controller 130) upon detection of a failure condition associated with one or more data disks. For instance, if one or more disks are deemed faulty due to occurrence of a threshold number of read or write errors, occurrence of a threshold number of read or write errors within a given time interval, etc., the recovery controller 130 can initialize recovery of the faulty disk(s) using the associated parity disks. In an aspect, recovery can occur via an iterative process as described below, and can terminate upon the failure condition being resolved.

In an aspect, since respective disk groups of the system shown in FIGS. 2-6 can be recovered individually as long as no more than two disks in the group are lost, recovery for the system can begin by recovering disk groups that have no more than two disk failures. In the example of a RAID-DP system, a disk group with four data disks has two parity disks. As a result, recovery can be conducted from any two or less losses of the six combined disks. It can be appreciated that, due to the non-uniform sizes of the respective disk groups, a disk group with one disk has the highest fault tolerance relative to other disk groups in that it can survive a loss of two of its three disks and still be recovered, whereas the largest disk groups with N disks have a lowest fault tolerance relative to other disk groups in the same sense that recovery cannot occur for the group if more than two of the N+2 disks in the group are faulty. Due to the symmetric nature of an equilateral triangle, the triangle RAID system shown by FIGS. 2-6 can function similarly if the bottom, left and/or right edges are interchanged or rotated.

In another aspect, multidimensional (e.g., triangular, etc.) RAID recoverability is achieved by conducting multiple passes as appropriate over respective stripes of the system. By way of specific example, consider a system in which three disks in a disk group have failed. Based solely on the remaining data blocks and parity blocks of that disk group, the failed disks are not recoverable using that disk group alone. However, because each of the three failed disks also belong to two other disk groups in the system and are protected by other parity blocks, all three of the failed disks can be recovered if even just one of the three disks can be recovered using other disk groups.

An example iterative technique for conducting recovery for a multidimensional RAID system with multiple disk failures is now illustrated with respect to FIGS. 7-11. It should be appreciated, however, that the techniques shown by FIGS. 7-11 could be utilized by structures different from those shown in said figures and that other techniques other than those shown by FIGS. 7-11 could also be used. In an aspect, recovery proceeds by performing multiple error correction passes over the 3N disk groups. It should be appreciated that the example shown by FIGS. 7-11 illustrates an extreme case with extensive drive failure, and generally recovery would be initiated upon initially detecting drive failures. However, despite the extent to which disks in the system are faulty, the technique shown by FIGS. 7-11 still results in full recovery of the system.

Figure 7:
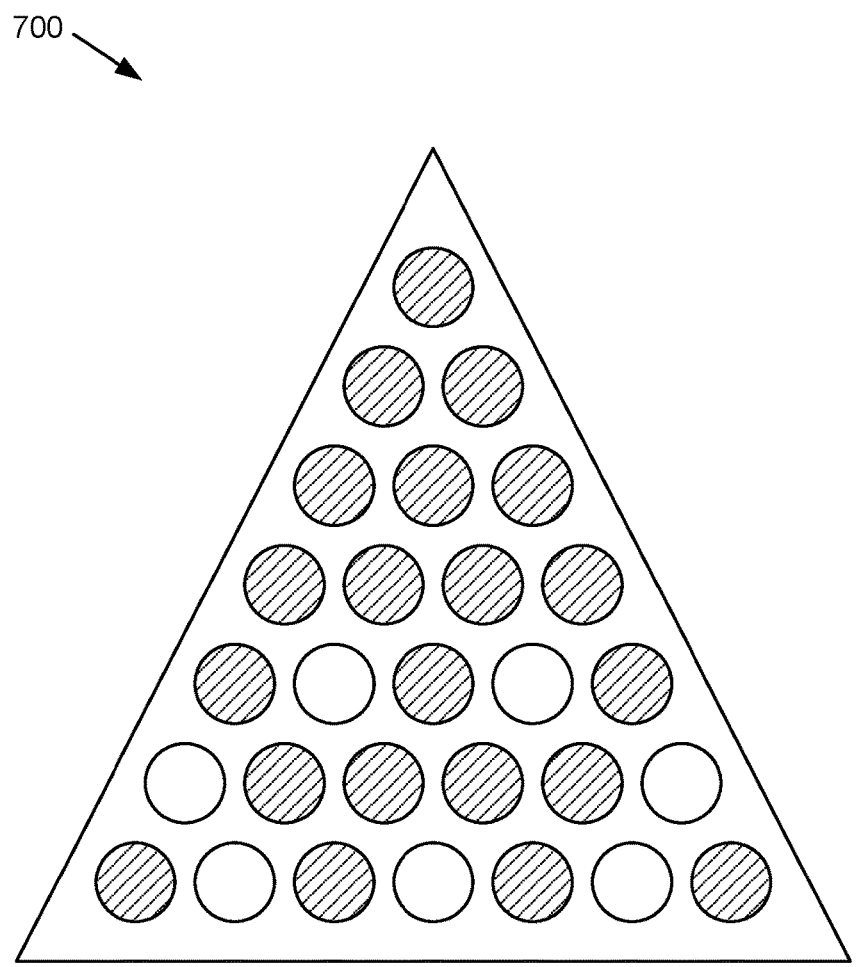
FIGS. 7-11 are diagrams depicting respective operations in a data recovery process using the triangular RAID array of FIG. 2.
Figure 7:
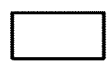
Figure 7:
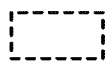
Figure 7:
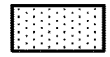

Diagram 700 in FIG. 7 shows an initial state of the system. As shown by diagram 700, a significant number of disks in the system have error-correcting code (ECC) errors and/or are otherwise faulty. In the steps that follow, these faulty disks are recovered using the properly functioning disks in the system as well as the parity disks associated with the respective disk groups of the system.

Figure 8:
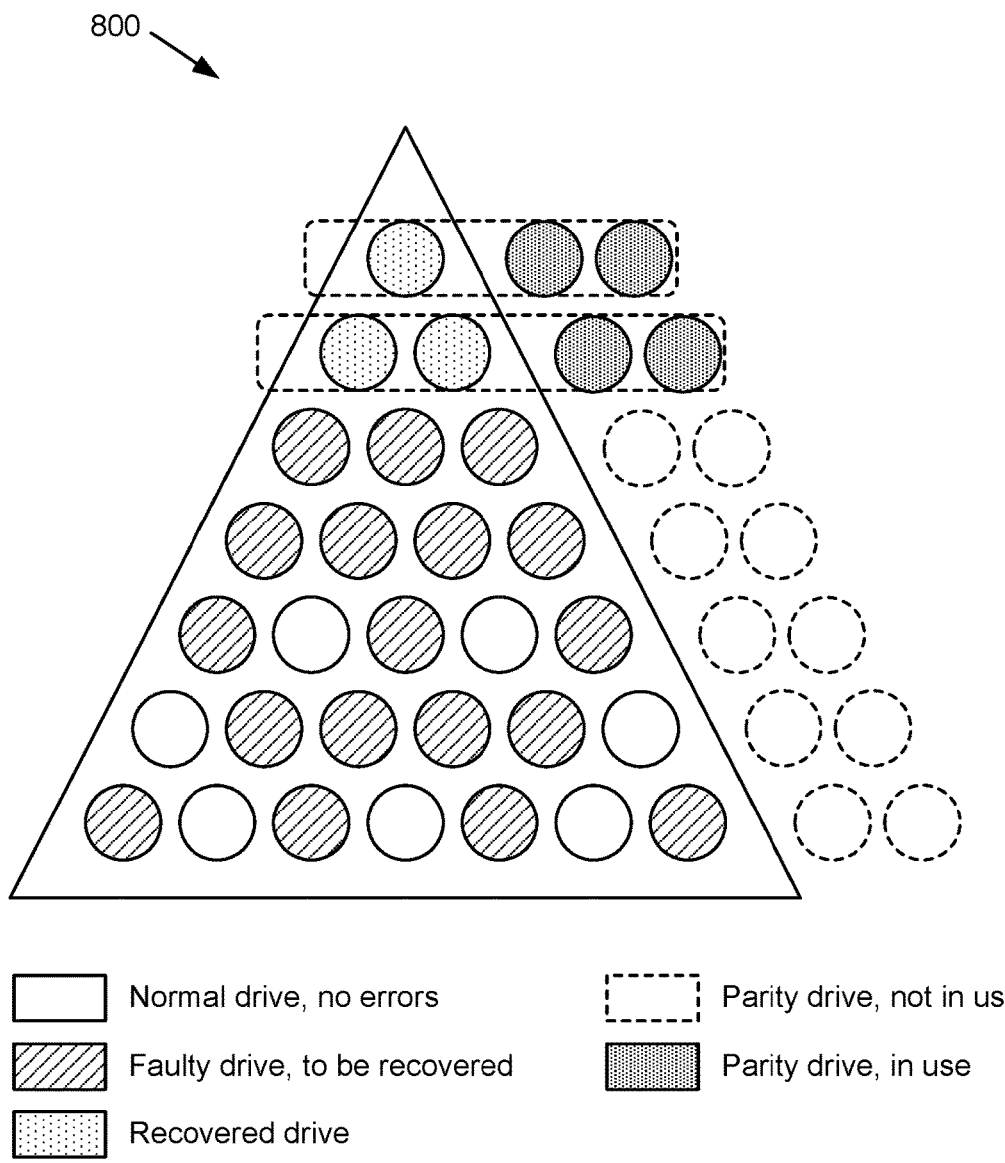

Turning next to FIG. 8, diagram 800 illustrates a first pass of the multidimensional RAID recovery process in which recovery is attempted for the respective EdgeB disk groups. As shown by diagram 800, only the first two EdgeB disk groups are recoverable in the first pass. The remaining disk groups have more than two drive failures and are not recovered at this stage.

Figure 9:
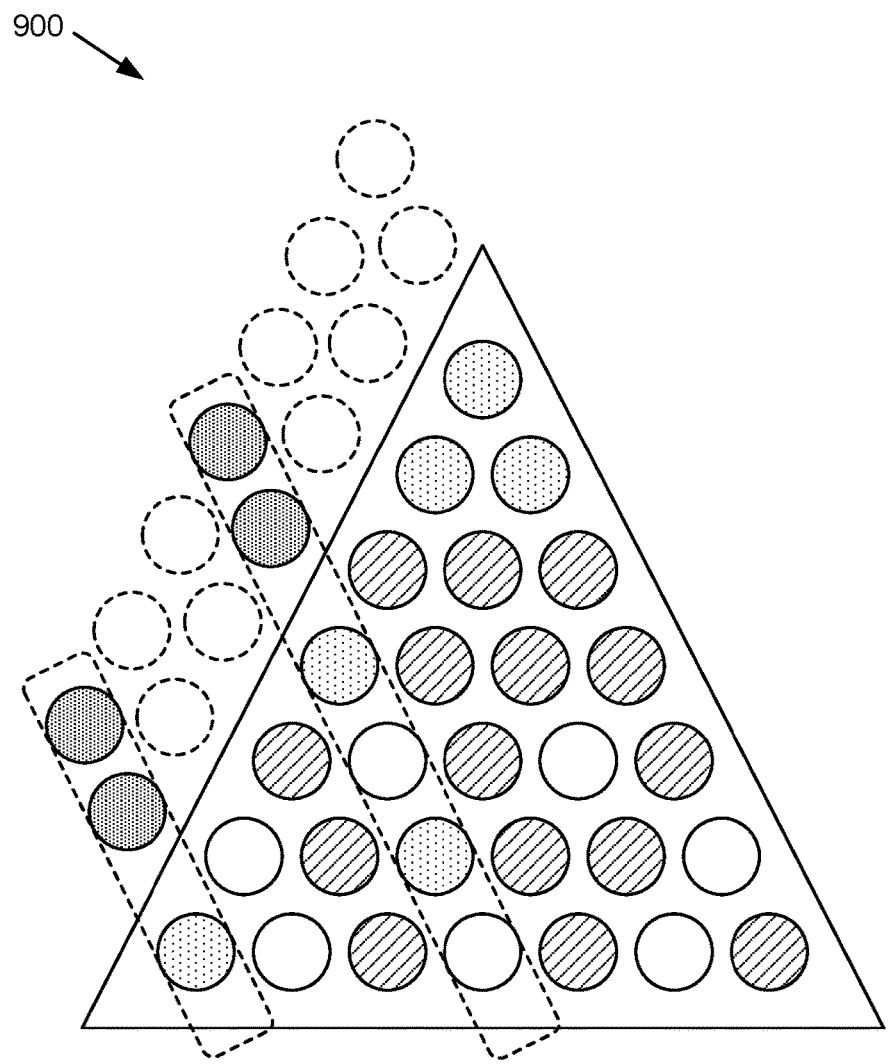
Figure 9:

In the second pass, as shown by diagram 900 in FIG. 9, respective ones of the EdgeR disk groups are scanned. As shown by diagram 900, only the first and fourth disk groups are recoverable in the second pass. Similar to the first pass, the remaining disk groups have more than two drive failures and are not recovered at this stage.

Figure 10:
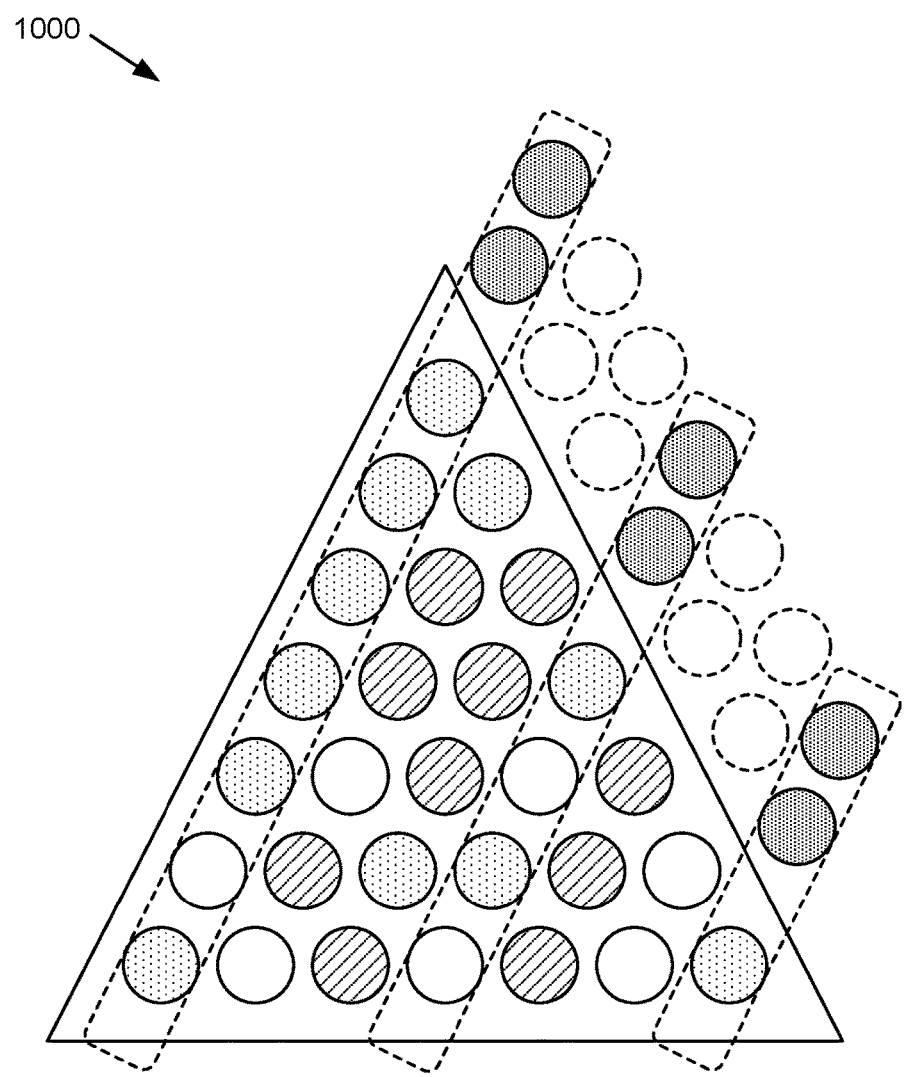

Diagram 1000 in FIG. 10 illustrates the third pass of the recovery process. Here, respective ones of the EdgeL disk groups are scanned. As shown by diagram 1000, the first, fourth, and seventh disk groups are recoverable at this stage. It should be appreciated that the seventh disk group is recoverable at this stage since two of the disks of the disk group were repaired in the first pass shown by diagram 800. In other words, recovery is incremental over each of the disk groups.

Figure 11:
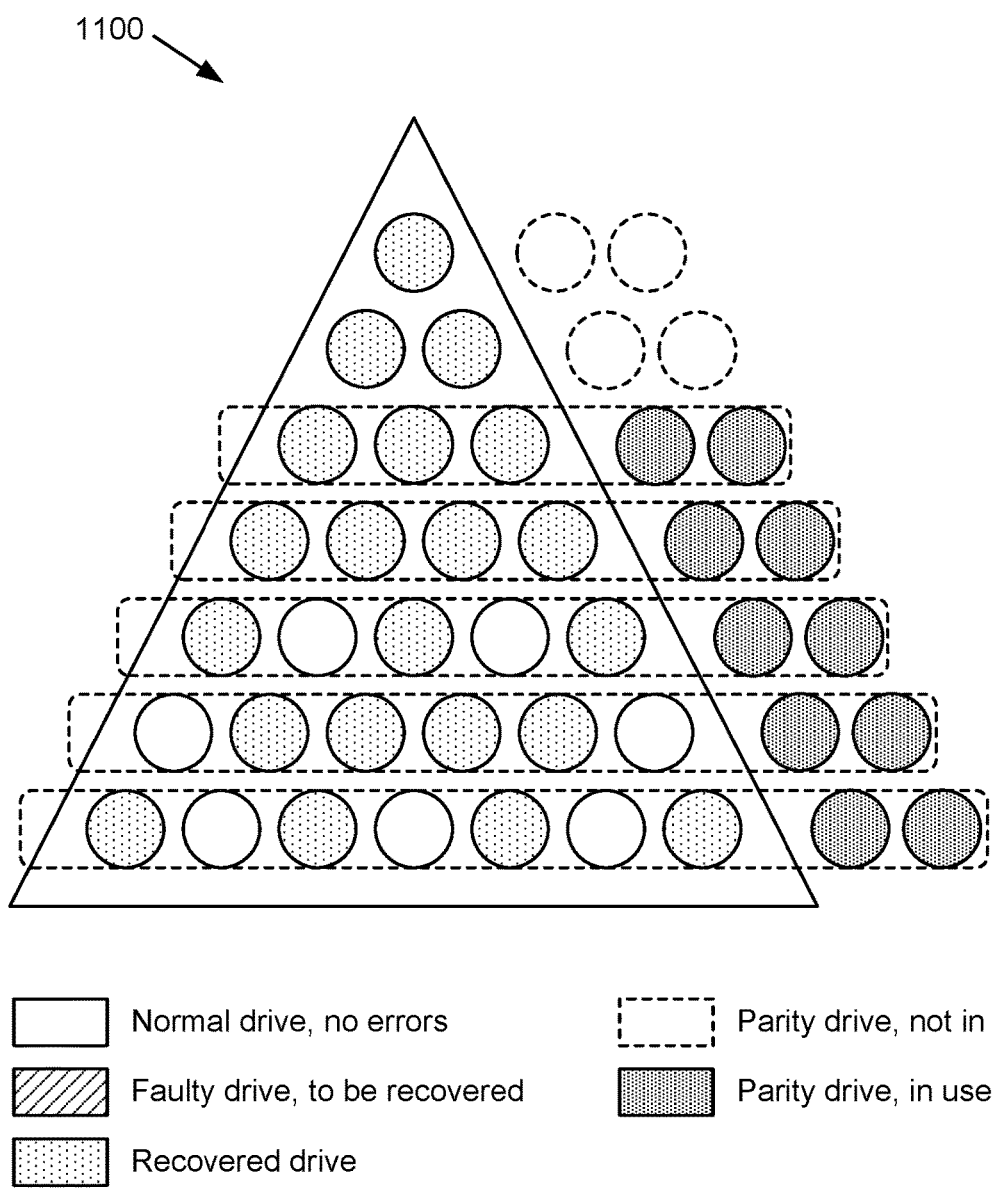

As shown by diagram 1100 in FIG. 11, if all of the disks of the system are not fixed in the first three-pass iteration, the recovery process can continue to iterate over the disk groups. Here, the recovery process performs a fourth pass by repeating a scan of the EdgeB disk groups. As shown in diagram 1100, the scan here reveals that all of the EdgeB disk groups have two or less disk failures and can be recovered. Thus, the remaining disks are recovered, and the recovery process ends due to resolution of the failure conditions associated with the disks in the system. In an example in which the fourth recovery pass does not result in full resolution of the faulty disks in the system, the recovery process can continue to iterate over the disk groups as shown by FIGS. 8-10 until either full recovery is achieved or no further recovery is possible.

Figure 12:
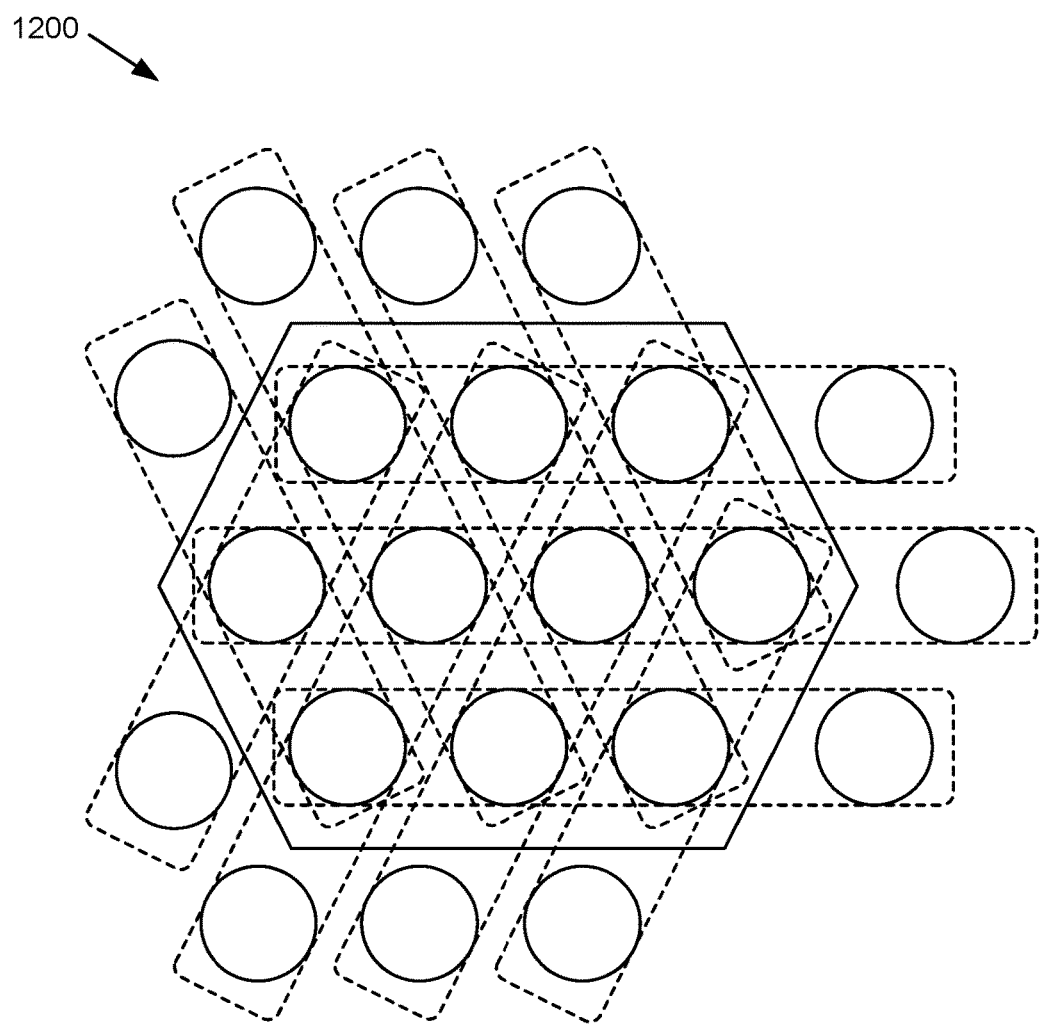
FIG. 12 is a diagram depicting an example configuration of storage disks in a hexagonal RAID array.

Turning next to FIG. 12, diagram 1200 depicts a multi-dimensional RAID system that utilizes a hexagonal structure. The hexagonal system functions in a similar manner to the triangular systems described above but differs in disk group size. Here, similar to the triangular systems described above, the hexagonal system is composed of multiple disk groups of non-uniform sizes that correspond to edges of the structure. In particular, the horizontal disk groups in diagram 1200 are of sizes 4 and 5, and the diagonal disk groups are of sizes 2 and 3. As further shown by diagram 1200, each disk group is associated with a single parity disk, thereby enabling each disk group to individually recover from a single disk failure.

With regard to the specific configuration shown by diagram 1200, it should be appreciated that the depicted configuration is merely one example of a configuration that can be utilized and other configurations are also possible. Further, similar to the triangular RAID system described above, it should be appreciated that the hexagonal layout shown in diagram 1200 is for purposes of visualization only and that the disks that comprise the system can be physically positioned in any suitable manner.

In an aspect, in addition to the configurations described above, a multidimensional RAID system as described herein can be configured logically in any suitable structure, e.g., any suitable "shape" with any number of edges. While the examples provided herein relate to a system having three edges and 3N associated disk groups, the system could alternatively be a pentagon, a heptagon, an octagon, etc., having more than three edges. In the case of a system having more than three edges, recovery would proceed by iterating over all of the edges and associated disk groups in a similar manner to that described above with respect to FIGS. 7-11.

Figure 13:
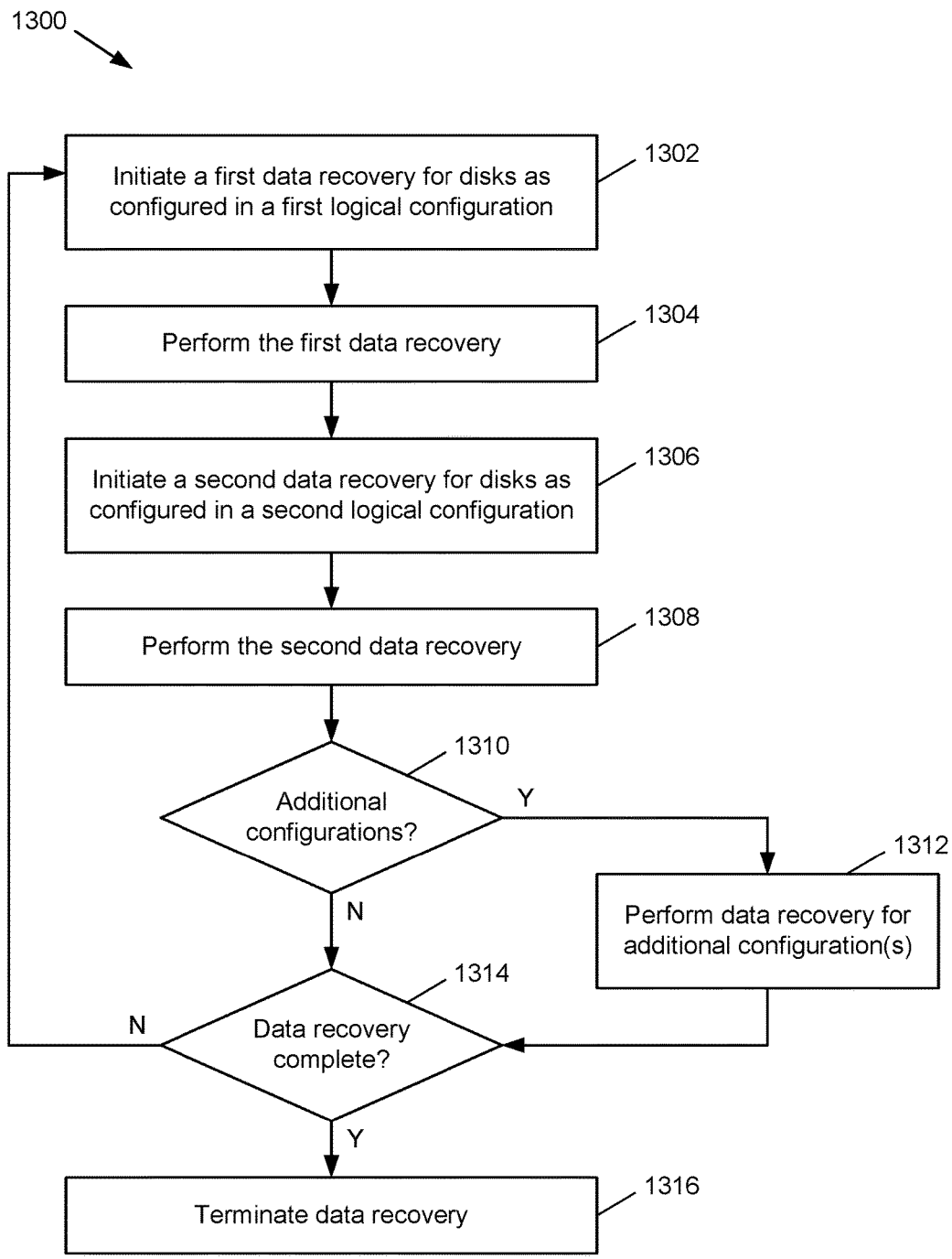
FIG. 13 is a flow diagram of a method for data storage and recovery according to various embodiments described herein.

FIG. 13 illustrates a method in accordance with certain aspects of this disclosure. While, for purposes of simplicity of explanation, the method is shown and described as a series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

With reference to FIG. 13, presented is a flow diagram of a process 1300 for data storage and recovery according to various embodiments described herein. At 1302, a first data recovery is initiated for disks, e.g., data storage devices 110, as configured in a first logical configuration. The first logical configuration can be associated with a first set of data disk groups and a first set of parity disk groups, and the first set of data disk groups can be structured such that at least one disk group in the first set of data disk groups has a different number of disks than at least one other disk group in the first set of data disk groups. In an aspect, the first logical configuration corresponds to a set of disk groups aligned with a first edge of the system, e.g., EdgeB disk groups 301-307 as shown by FIG. 3.

At 1304, the first data recovery is performed, e.g., by the recovery controller 130, for the disks in the first set of data disk groups via their associated parity disks, e.g., parity disks 401-407 for EdgeB disk groups 301-307. In an aspect, the recovery at 1304 can be performed by the recovery controller 130 in response to detecting a failure condition associated with the data storage devices 110 by submitting a recovery instruction to the data storage devices 110, the parity storage devices 122, 124, 126, and/or by any other suitable initializing action.

At 1306, a second data recovery is initiated for the disks as configured in a second logical configuration. Like the first logical configuration, the second logical configuration can be associated with a second set of data disk groups and a second set of parity disk groups, and the second set of data disk groups can be structured such that at least one disk group in the second set of data disk groups has a different number of disks than at least one other disk group in the second set of data disk groups. The second logical configuration can correspond to, e.g., the EdgeR disk groups 501-507 and associated parity disks 511-517 as shown by FIG. 5 and/or any other suitable configuration.

At 1308, the second data recovery is performed for the disks in the second set of data disk groups via the parity disks respectively associated with those disk groups. In an aspect, the second data recovery is conducted in a similar manner to the first data recovery performed at 1304. The second data recovery can be performed subsequent to the first data recovery and utilize disks and/or other information recovered during the first data recovery. Alternatively, the second data recovery can be performed before, or simultaneously with, the first data recovery.

At 1310, if there are additional logical configurations in which the disks are configured (e.g., the EdgeL disk groups 601-607 and associated parity disks 611-617 shown by FIG. 6, etc.), process 1300 proceeds to 1312, at which data recovery is performed for the additional configuration(s). In an aspect, the additional data recovery performed at 1312 can be conducted in a similar manner to the first data recovery at 1302-1304 and/or the second data recovery at 1306-1308. Additionally, similar to the second data recovery, any additional data recovery performed at 1312 can be conducted before, during, or after the first data recovery and/or the second data recovery.

If no further configurations are present as determined at 1310, or upon conclusion of the additional data recovery at 1312, process 1300 continues to 1314 to determine whether data recovery is complete, e.g., whether all disks in the system have been recovered, and/or whether no further data recovery is possible. If the data recovery has been completed, process 1300 terminates data recovery at 1316. Otherwise, process 1302 returns to 1300 to perform additional recovery iterations as appropriate.

While the determination at 1314 is illustrated at the conclusion of all recovery passes in a given iteration, it should be appreciated that data recovery could terminate prior to completion of all passes in some cases. For instance, if a data recovery pass results in successful recovery of all faulty disks, e.g., as shown by diagram 1100 in FIG. 11, data recovery could conclude at the completion of the relevant pass without proceeding to additional passes.

Figure 14:
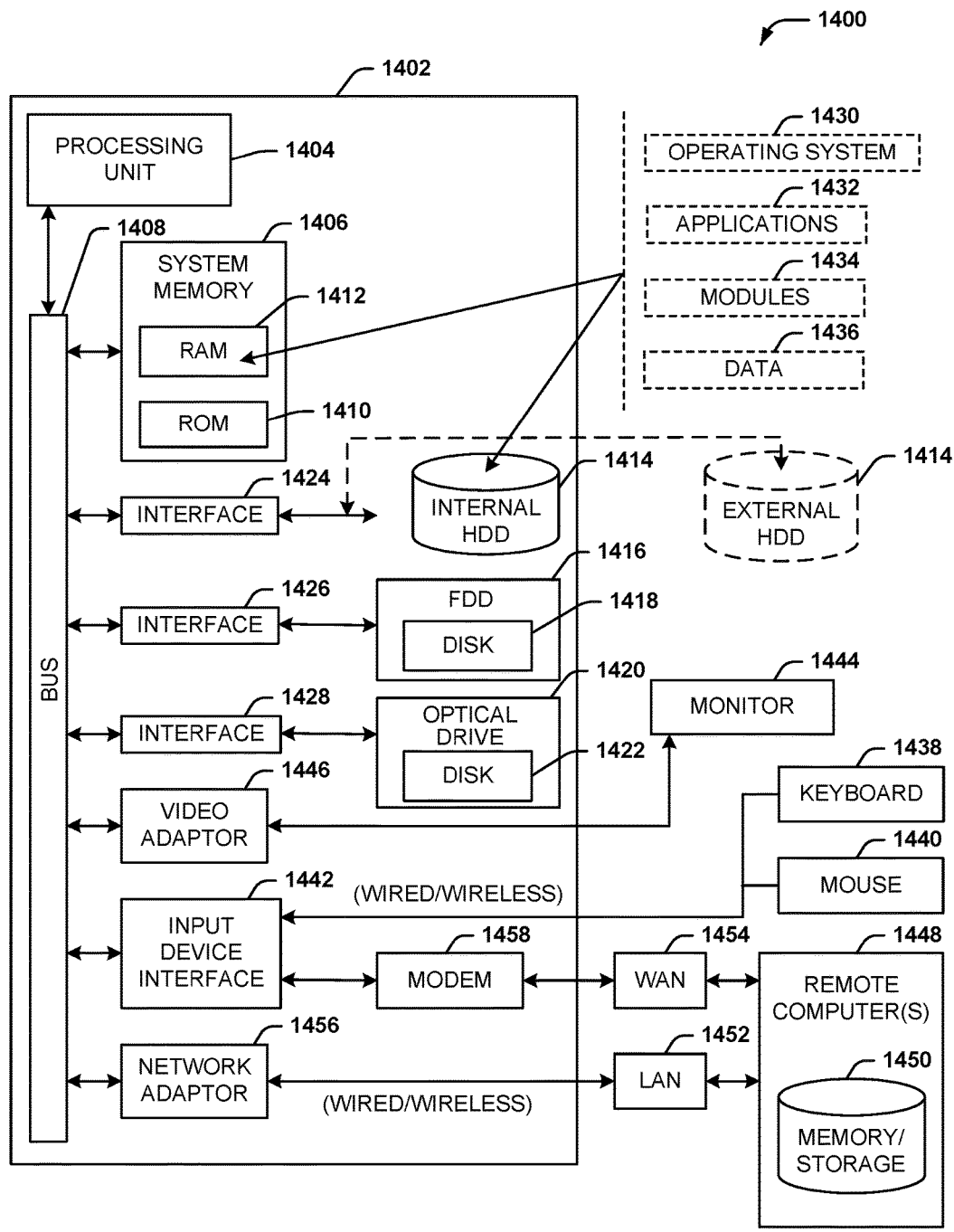
FIG. 14 is a diagram of an example computing environment in which various embodiments described herein can function.

Referring now to FIG. 14, there is illustrated a block diagram of a computing environment in accordance with various aspects described herein. For example, in some embodiments, the computer can be or be included within the data storage disks 110, the parity disks 122-126, and/or the recovery controller 130.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD-ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). While the internal HDD 1414 is illustrated as located within the computer 1402, the internal HDD 1414 can also be configured for external use in a suitable chassis (not shown). The HDD 1414, magnetic FDD 1416 and optical disk drive 1420 can be connected to the system bus 1408 by an HDD interface 1424, a magnetic disk drive interface 1426 and an optical drive interface 1428, respectively. The interface 1424 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to an HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

A user can enter commands and information into the computer 1402 through one or more wired/wireless input devices, e.g., a keyboard 1438 and a pointing device, such as a mouse 1440. Other input devices (not shown) can include a microphone, an infrared (IR) remote control, a joystick, a game pad, a stylus pen, touch screen or the like. These and other input devices are often connected to the processing unit 1404 through an input device interface 1442 that can be coupled to the system bus 1408, but can be connected by other interfaces, such as a parallel port, an IEEE 1394 serial port, a game port, a USB port, an IR interface, etc.

A monitor 1444 or other type of display device can be also connected to the system bus 1408 via an interface, such as a video adapter 1446. In addition to the monitor 1444, a computer typically includes other peripheral output devices (not shown), such as speakers, printers, etc.

The computer 1402 can operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1452 through a wired and/or wireless communication network interface or adapter 1456. The adapter 1456 can facilitate wired or wireless communication to the LAN 1452, which can also include a wireless access point (AP) disposed thereon for communicating with the wireless adapter 1456.

When used in a WAN networking environment, the computer 1402 can include a modem 1458 or can be connected to a communications server on the WAN 1454 or has other means for establishing communications over the WAN 1454, such as by way of the Internet. The modem 1458, which can be internal or external and a wired or wireless device, can be connected to the system bus 1408 via the input device interface 1442. In a networked environment, program modules depicted relative to the computer 1402 or portions thereof, can be stored in the remote memory/storage device 1450. It will be appreciated that the network connections shown are example and other means of establishing a communications link between the computers can be used.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A data storage system, comprising:
    data storage devices configured in a plurality of logical configurations, wherein the logical configurations are respectively associated with respective groups of the data storage devices, wherein the respective groups of the data storage devices are structured such that among first groups of the respective groups of data storage devices that are associated with a first logical configuration of the plurality of logical configurations, no two of the first groups have a same number of the data storage devices, and wherein each of the data storage devices belongs to multiple ones of the respective groups of the data storage devices; and
    parity storage devices communicatively coupled to the data storage devices, wherein respective ones of the groups of the data storage devices are associated with a uniform number of the parity storage devices.

2. The data storage system of claim 1, wherein the plurality of logical configurations of the data storage devices comprises at least three configurations.

3. The data storage system of claim 1, wherein the respective parity storage devices comprise respective pairs of parity storage devices associated with respective groups of the data storage devices.

4. The data storage system of claim 3, wherein the respective pairs of parity storage devices store diagonal parity information for the respective groups of the data storage devices.

5. The data storage system of claim 1, further comprising a storage recovery component that facilitates a recovery of respective content of the data storage devices via the respective parity storage devices.

6. The data storage system of claim 5, wherein the storage recovery component facilitates the recovery by cycling a data recovery instruction through the respective groups of the data storage devices in the respective logical configurations.

7. The data storage system of claim 6, wherein the storage recovery component initiates the recovery in response to a first detection of a failure condition associated with the data storage devices and terminates the recovery in response to a second detection that the failure condition has been resolved.

8. The data storage system of claim 1, wherein at least one of the data storage devices is a solid state drive.

9. The data storage system of claim 8, wherein the storage devices comprise logical units of the solid state drive.

10. The data storage system of claim 1, wherein, for an integer N representing a number of the first groups of the respective groups of data storage devices, the first groups of the respective groups of data storage devices consist of an increasing number of data storage devices from one data storage device to N data storage devices, respectively.

11. The data storage system of claim 1, wherein at least one of the groups of the data storage devices is associated with fewer data storage devices than parity storage devices.

12. A method, comprising:
    initiating, by a system comprising a processor, a first data recovery for disks as configured in a first logical configuration comprising a first set of disk groups, wherein respective ones of the first set of disk groups comprise one or more data disks and one or more first parity disks, wherein no two disk groups of the first set of disk groups have a same number of the data disks, and wherein the disk groups of the first set of disk groups have uniform numbers of the first parity disks;
    performing the first data recovery for the respective ones of the first set of disk groups via their respectively associated first parity disks;
    initiating a second data recovery for the disks as configured in a second logical configuration comprising a second set of disk groups, wherein respective ones of the second set of disk groups comprise one or more of the data disks and one or more second parity disks that are distinct from the first parity disks, wherein no two disk groups of the second set of disk groups have a same number of the data disks, wherein the disk groups of the second set of disk groups have uniform numbers of the second parity disks, and wherein the respective ones of the second set of disk groups are distinct from the respective ones of the first set of disk groups; and
    performing the second data recovery for the respective ones of the second set of disk groups via their respectively associated second parity disks;
    wherein each of the data disks belongs to respective disk groups in both the first set of disk groups and the second set of disk groups.

13. The method of claim 12, further comprising:
    initiating a third data recovery for the disks as configured in a third logical configuration comprising a third set of disk groups, wherein respective ones of the third set of disk groups comprise one or more of the data disks and one or more third parity disks that are distinct from the first parity disks and the second parity disks, wherein no two disk groups of the third set of disk groups have a same number of the data disks, wherein the disk groups of the third set of disk groups have uniform numbers of the third parity disks, and wherein the respective ones of the third set of disk groups are distinct from the respective ones of the first set of disk groups and the second set of disk groups; and performing the third data recovery for the respective ones of the third set of disk groups via their respectively associated third parity disks.

14. The method of claim 12, wherein the initiating the first data recovery comprises initiating the first data recovery in response to detecting a failure condition associated with one or more of the disks.

15. The method of claim 14, further comprising:

iterating the first data recovery and at least the second data recovery; and halting the iterating in response to detecting that the failure condition has been resolved.

16. A system, comprising:

data disks;

a first group of parity disks, wherein uniform numbers of the first group of parity disks are associated with respective first groupings of the data disks, and wherein no two of the first groupings of the data disks are associated with a same number of the data disks;

a second group of parity disks, wherein uniform numbers of the second set of parity disks are associated with respective second groupings of the data disks, wherein the second groupings of the data disks are distinct from the first groupings, and wherein no two of the second groupings of the data disks are associated with a same number of the data disks; and a third group of parity disks, wherein uniform numbers of the third set of parity disks are associated with respective third groupings of the data disks, wherein the third groupings of the data disks are distinct from the first groupings the second groupings, and wherein no two of the third groupings of the data disks are associated with a same number of the data disks;

wherein each of the data disks are associated with groupings in each of the first groupings of the data disks, the second groupings of the data disks, and the third groupings of the data disks.

17. The system of claim 16, wherein:

the first group of parity disks comprises first respective groups of two parity disks corresponding to the first respective groupings, the second group of parity disks comprises second respective groups of two parity disks corresponding to the second respective groupings, and the third group of parity disks comprises third respective groups of two parity disks corresponding to the third respective groupings.

18. The system of claim 16, further comprising a controller that facilitates recovery of contents of respective ones of the data disks via respective ones of the first group of parity disks, the second group of parity disks, and the third group of parity disks.

19. The system of claim 18, wherein the controller cycles data recovery operations through respective first groupings of the data disks and associated first ones of the first group of parity disks, respective second groupings of the data disks and associated second ones of the second group of parity disks, and respective third groupings of the data disks and associated third ones of the third group of parity disks.

\* \* \* \* \*